(12) United States Patent
Nakaya et al.

(10) Patent No.: US 9,534,065 B2
(45) Date of Patent: Jan. 3, 2017

(54) MOLDING MATERIAL AND MOLDING

(75) Inventors: Fuminori Nakaya, Hiroshima (JP); Tetsuya Noda, Hiroshima (JP); Keiichi Sakashita, Hiroshima (JP); Hiroyuki Nogami, Kanagawa (JP); Takafumi Asai, Hiroshima (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 14/123,158

(22) PCT Filed: May 30, 2012

(86) PCT No.: PCT/JP2012/063936
§ 371 (c)(1),
(2), (4) Date: Nov. 29, 2013

(87) PCT Pub. No.: WO2012/165482
PCT Pub. Date: Dec. 6, 2012

(65) Prior Publication Data
US 2014/0100345 A1 Apr. 10, 2014

(30) Foreign Application Priority Data
May 30, 2011 (JP) .................. 2011-120449

(51) Int. Cl.
| C08F 26/06 | (2006.01) |
| B29C 45/00 | (2006.01) |
| C08F 220/14 | (2006.01) |
| C08J 5/18 | (2006.01) |
| C08F 2/44 | (2006.01) |

(52) U.S. Cl.
CPC .............. *C08F 26/06* (2013.01); *B29C 45/00* (2013.01); *C08F 2/44* (2013.01); *C08F 220/14* (2013.01); *C08J 5/18* (2013.01); *C08J 2333/12* (2013.01); *C08J 2333/14* (2013.01); *C08J 2333/24* (2013.01)

(58) Field of Classification Search
CPC .......... B29C 45/00; C08F 2/44; C08F 220/14; C08F 26/06; C08J 5/18; C08J 2333/12; C08J 2333/14; C08J 2333/24

USPC ....................... 526/263; 264/328.1
See application file for complete search history.

(56) References Cited

U.S. PATENT DOCUMENTS

| 6,251,986 B1 | 6/2001 | Ide et al. |
| 6,433,044 B1* | 8/2002 | Maekawa et al. .............. 524/99 |
| 2006/0229407 A1 | 10/2006 | Vogel et al. |
| 2009/0104447 A1* | 4/2009 | Kita et al. ..................... 428/412 |
| 2012/0245318 A1* | 9/2012 | Nakaya et al. ............... 526/263 |

FOREIGN PATENT DOCUMENTS

| JP | 1 113368 | 5/1989 |
| JP | 2 281009 | 11/1990 |
| JP | 10 219140 | 8/1998 |
| JP | 2000 103924 | 4/2000 |
| JP | 2001 210314 | 8/2001 |
| JP | 2001 210365 | 8/2001 |
| JP | 2006 526670 | 11/2006 |
| JP | 2008 127527 | 6/2008 |
| JP | 2008 231307 | 10/2008 |
| JP | 2010 215902 | 9/2010 |
| WO | 2011 068110 | 6/2011 |

OTHER PUBLICATIONS

International Search Report Issued Jun. 26, 2012 in PCT/JP12/063936 Filed May 30, 2012.
U.S. Appl. No. 14/123,147, filed Nov. 29, 2013, Noda, et al.
Office Action issued Aug. 7, 2015 in Taiwanese Patent Application No. 101119333 (with partial English translation).

\* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

An object of the invention is to provide a molding with suppressed coloring which has good weather resistance and in which the advantageous effect does not decrease with time. The present invention provides a molding material comprising a polymer (A) obtained by polymerizing 0.01 to 35 mol % of monomer (a1) represented by a specified formula (1) and 65 to 99.99 mol % of monomer (a2) whose main component is methylmethacrylate.

7 Claims, No Drawings

MOLDING MATERIAL AND MOLDING

TECHNICAL FIELD

The present invention relates to a molding material obtained by polymerization of monomer components comprising a monomer having a piperidine skeleton, and a molding obtained from the molding material.

BACKGROUND ART

In recent years, from the viewpoint of reduction of equipment maintenance costs and reduction of environmental load, weather resistance improvement of polymer material used under severe condition such as outdoors is strongly required.

For the purpose of weather resistance improvement of the polymer material used as coating, patent document 1 proposes adding a hindered amine light stabilizer having a piperidine skeleton (hereinafter, referred to as "HALS"), particularly whose nitrogen atom is substituted by various kinds of OR groups (hereinafter, referred to as "NOR-HALS") (O represents oxygen atom, R represents alkyl group) to coating material components.

Although the NOR-HALS has an advantageous effect in weather resistance improvement of the polymer material, it has a problem of gradually vanishing from the polymer material by migration or volatilization and the advantageous effect decreases with time.

For the purpose of solving this problem, patent document 2 proposes copolymerizing a polymerizable NOR-HALS (hereinafter, referred to as "polymerizable NOR-HALS") having a vinyl group in its molecule, to add to coating material components.

CITATION LIST

Patent Literature

Patent document 1: JP 01-113368 A
Patent document 2: JP 02-281009 A

SUMMARY OF INVENTION

Technical Problem

Although patent document 2 proposes adding a copolymer of a polymerizable NOR-HALS to coating material components, it does not suggest using a copolymer of a polymerizable NOR-HALS as a molding material and its molding.

It is an object of the present invention to provide a molding with suppressed coloring which has good weather resistance and in which the advantageous effect does not decrease with time.

Solutions to Problem

If a copolymer of a polymerizable NOR-HALS is used as a molding, and if weather resistance of the molding per se can be improved, it is meaningful from the viewpoint of reduction of equipment maintenance costs and reduction of environmental load.

However, from the study of the present inventors, in the case of molding a copolymer of a polymerizable NOR-HALS by dissolving a resin such as in an extrusion molding or an injection molding, heating at the time of molding process results in dissociation of a group which is connected to nitroxide (—NO—), and coloring of the obtained molding is confirmed.

And so, as a result of the diligent study of the present inventors, it is found that a molding with suppressed coloring while comprising NOR-HALS can be obtained by appropriately selecting a group which is connected to nitroxide.

Namely, the present invention is shown in the following [1] to [9].

[1] A molding material (B) comprising a polymer (A) obtained by polymerizing 0.01 to 35 mol % of monomer (a1) represented by the following general formula (1) and 65 to 99.99 mol % of monomer (a2) whose main component is methylmethacrylate.

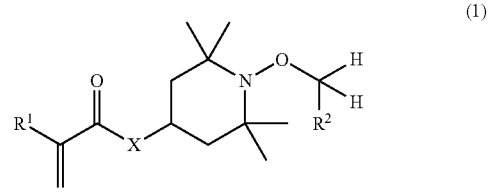

(1)

(In the formula (1), $R^1$ represents a hydrogen atom or a methyl group. X represents an oxygen atom or an imino group. $R^2$ represents a hydrogen atom, a linear alkyl group with a carbon number of 1 to 8, a branched alkyl group with a carbon number of 1 to 8, an alicyclic hydrocarbon group with a carbon number of 6 to 8 which may have a substituent, or an aryl group which may have a substituent.).

[2] The molding material (B) of the above [1], wherein in the case a molding of a thickness of 2 mm is obtained by molding the molding material, a total light transmittance is 85 to 100%, more preferably 90 to 100%, and a haze value is 5% or less.

[3] The molding material according to the above [1] or [2], wherein a content of a component derived from the monomer (a1) in 100 wt % of the above molding material (B) is 0.01 to 50 wt %.

[4] The molding material according to any of [1] to [3], wherein a content of the polymer (A) is 50 wt % or more.

[5] A method of molding the molding material (B) according to any of the above [1] to [4] at a temperature of 280° C. or lower.

[6] A molding obtained by the above method [5].

[7] The molding according to [6], wherein a total light transmittance of the molding at a thickness of 2 mm is 85 to 100%, and a haze value of the molding at a thickness of 2 mm is 5% or less.

[8] The molding material (B) according to any of [1] to [4], wherein the molding produced under the below condition has a low yellow index. Note that in the present invention, a yellow index is a value of a yellow index measurement done under the below condition, regarding the molding produced by the below method.

<Molding Producing Method>

The polymer is supplied to a compact injection molding machine CS-183-MMX (made by Custom Scientific Instruments Inc.), fused and held for 3 minutes. Then, using a mold of 10 mm×20 mm×2 mm, the molding was produced by injection molding at a mold temperature of 60° C.

<Yellow Index Measurement>

A transmission spectrum of the obtained molding was measured by a spectrophotometer MCPD-3000 (made by Otsuka electronics Co., Ltd.) and the yellow index was measured.

[9] The molding according to [7], wherein the yellow index is low.

Effects of Invention

According to a molding material of the present invention, a molding with a suppressed coloring even when heated by a fusion molding process can be obtained.

DESCRIPTION OF EMBODIMENTS

A polymer which a molding material of the present invention comprises is a polymer obtained by polymerizing a monomer (a1). The monomer (a1) will be described below.
<Monomer (a1)>

The Monomer (a1) used in the present invention belongs to a polymerizable NOR-HALS, and is represented by the following formula (1).

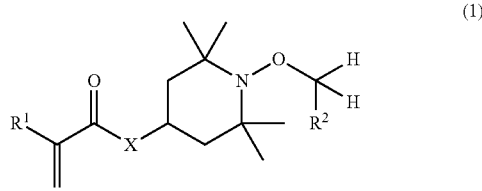

(1)

(In the formula (1), $R^1$ represents a hydrogen atom or a methyl group. X represents an oxygen atom or an imino group. $R^2$ represents a hydrogen atom, a linear or a branched alkyl group with a carbon number of 1 to 8, an alicyclic hydrocarbon group with a carbon number of 6 to 8 which may have a substituent, or an aryl group which may have a substituent.).

Since the monomer (a1) has the construction of NOR-HALS, it is anticipated that a polymer or a copolymer of the monomer (a1) has good weather resistance.

In the formula (1), it is preferable that X is an oxygen atom because the monomer (a1) is easily synthesized.

In the formula (1), it is preferable that $R^2$ is a hydrogen atom, a linear or a branched alkyl group with a carbon number of 1 to 8 because the obtained molding comes to have a good appearance and weather resistance. Also, it is more preferable that $R^2$ is a hydrogen atom, a linear or a branched alkyl group with a carbon number of 1 to 6. Also, it is further preferable that $R^2$ is a hydrogen atom, a linear or a branched alkyl group with a carbon number of 1 to 4, and most preferable that it is a hydrogen atom.

Examples of the monomer (a1) include, for example, from the view point of easiness of synthesizing, 1-methyloxy-2,2,6,6-tetramethyl-4-(meth)acryloyloxypiperidine, 1-methyloxy-2,2,6,6-tetramethyl-4-(meth)acrylamidepipedirine, 1-ethyloxy-2,2,6,6-tetramethyl-4-(meth)acryloyloxypiperidine, 1-ethyloxy-2,2,6,6-tetramethyl-4-(meth)acrylamidepiperidine, 1-propyloxy-2,2,6,6-tetramethyl-4-(meth)acryloyloxypiperidine, 1-propyloxy-2,2,6,6-tetramethyl-4-(meth)acrylamidepipedirine.

Among them, 1-methyloxy-2,2,6,6-tetramethyl-4-(meth)acryloyloxypiperidine, 1-methyloxy-2,2,6,6-tetramethyl-4-(meth)acrylamidepipedirine, 1-ethyloxy-2,2,6,6-tetramethyl-4-(meth)acryloyloxypiperidine, 1-ethyloxy-2,2,6,6-tetramethyl-4-(meth)acrylamidepipedirine are preferable because a coloring of the obtained molding is low.

With respect to the monomer (a1), one kind may be used alone, or two or more kinds may be combined.

Note that, in the present invention, (meth)acryl means acryl or methacryl, and (meth)acryloyl means acryloyl or methacryloyl.

The monomer (a1) can be synthesized by a known method.

For example, 1-methyloxy-2,2,6,6-tetramethyl-4-methacryloyloxypiperidine (hereinafter, referred to as "monomer (a1-1)") can be synthesized by, according to the method disclosed in JP 2009-541428 A, synthesizing 1-methyloxy-2,2,6,6-tetramethyl-4-hydroxypiperidine, and thereafter carrying out a reaction with methacryloyl chloride.

More specifically, 2,2,6,6-tetramethyl-4-hydroxypiperidine-N-oxide is reacted with acetone and 30% hydrogen peroxide aqueous solution, in a presence of copper chloride (I). Then, the obtained 1-methyloxy-2,2,6,6-tetramethyl-4-hydroxypiperidine is reacted with methacryloyl chloride to synthesize monomer (a1-1).

Also, 1-ethyloxy-2,2,6,6-tetramethyl-4-methacryloyloxypiperidine (hereinafter, referred to as "monomer (a1-2)") can be synthesized by, according to the method disclosed in JP 2009-541428 A, synthesizing 1-ethyloxy-2,2,6,6-tetramethyl-4-hydroxypiperidine, and thereafter carrying out a reaction with methacryloyl chloride.

More specifically, 2,2,6,6-tetramethyl-4-hydroxypiperidine-N-oxide is reacted with methylethylketone and 30% hydrogen peroxide aqueous solution, in a presence of copper chloride (I), then the obtained 1-ethyloxy-2,2,6,6-tetramethyl-4-hydroxypiperidine is reacted with methacryloyl chloride to synthesize monomer (a1-2).

A polymer which the molding material of the present invention comprises is obtained by polymerizing the monomer (a1) and a monomer (a2). The monomer (a2) will be described below.
<Monomer (a2)>

The monomer (a2) used in the present invention is a monomer whose main component is methylmethacrylate. In the present invention, "main component" means 50 wt % or more of the total.

The monomer (a2) has a methylmethacrylate content of 50 wt % or more, preferably 75 wt % or more, and more preferably 90 wt % or more. In this regard, the total amount of the monomer (a2) is set to be 100 wt %.

If the monomer (a2) has a methylmethacrylate content of 50 wt % or more, the obtained molding comes to have good appearance, good mechanical strength, and good weather resistance.

The monomer (a2) can contain a monomer other than methylmethacrylate. The content of the monomer other than methylmethacrylate in the monomer (a2) is 50 wt % or less, preferably less than 50 wt %, more preferably 25 wt % or less, and further preferably 10 wt % or less.

If the content of the monomer other than methylmethacrylate in the monomer (a2) is made 50 wt % or less, the obtained molding comes to have good appearance, good mechanical strength, and good weather resistance.

Examples of the monomer contained in the monomer (a2) other than methylmethacrylate include, for example, (meth)acrylates such as methyl acrylate, ethyl(meth)acrylate, cyclohexyl(meth)acrylate, isobornyl(meth)acrylate, phenyl (meth)acrylate, and benzyl(meth)acrylate; aromatic vinyl monomers such as styrene and α-methyl styrene; silicon containing monomers such as vinyl trimethoxysilane;

maleic acid type monomers such as maleic anhydride, maleic acid, and maleic acid monoalkyl ester; fumaric acid type monomers such as fumaric acid and fumaric acid monoalkyl ester; maleimide type monomers such as maleimide and N-methyl maleimide; vinyl cyanide monomers such as (meth)acrylonitrile; and cross-linkable monomers such as ethyleneglycoldi(meth)acrylate and divinylbenzene.

With respect to these, one kind may be used alone, or two or more kinds may be combined.

Among these, aromatic vinyl monomers such as styrene and vinyl cyanide monomers are preferable because the obtained molding comes to have good appearance, good mechanical strength, and good weather resistance.

The polymer (A) of the present invention can be produced by the following methods.

A polymer mixture which comprises 0.01 to 35 mol % of the monomer (a1) and 65 to 99.99 mol % of the monomer (a2) is polymerized. Here, a mixture includes the monomer (a1) and the monomer (a2) as a monomer component. The monomer (a1) and the monomer (a2) can be mixed preliminarily before starting of the polymerization, or can be added individually by dropping separately during the polymerization.

It is preferable that the monomer mixture contains 0.03 to 15 mol % of the monomer (a1) and 85 to 99.97 mol % of the monomer (a2), and more preferable that it contains 0.03 to 10 mol % of the monomer (a1) and 90 to 99.97 mol % of the monomer (a2). If the content rate of the polymer in the molding material (B) is 50 wt % or more, it is further preferable that the monomer mixture contains 0.03 to 5 mol % of the monomer (a1) and 95 to 99.97 mol % of the monomer (a2).

If the content rate of the monomer (a1) in the monomer mixture is 0.01 mol % or more, there is a sufficient advantageous effect of weather resistance improvement. If it is 35 mol % or less, the obtained molding comes to have good appearance and good mechanical strength.

It is preferable that the monomer mixture is polymerized at a temperature of 280° C. or lower. Note that, in the present invention, the highest treatment temperature in a polymerization process is called "polymerization temperature".

The polymerization temperature is preferably in a range of 40 to 210° C., and more preferably in a range of 70 to 100° C.

If the polymerization temperature is 280° C. or lower, group which is connected to nitroxide of the monomer (a1) is suppressed from being dissociated during the polymerization, and coloring of the obtained polymer becomes difficult. Also, if the polymerization temperature is 40° C. or higher, the polymerization conversion ratio of the monomer used improves.

Although as methods to obtain the polymer (A), the known methods of a mass polymerization method, a suspension polymerization method, and an emulsion polymerization method are possible, from the easiness of management, the suspension polymerization method is preferred. In the following, as an example, a case of producing the polymer (A) by the suspension polymerization method will be explained. First, a polymerization initiator and where appropriate a chain transfer agent are dissolved in the monomer mixture comprised of the monomer (a1) and the monomer (a2). Next, after the obtained homogeneous mixed liquid is suspended in an aqueous medium with the presence of a dispersion stabilizer, polymerization is completed by holding for a fixed period of time at a predetermined polymerization temperature, then, the polymer can be obtained by filtering, washing with water, and drying the obtained suspended polymer. Note that, other than the above, it is fine to arbitrarily add the monomer (a1) or the monomer (a2), mixture of the monomer (a1) and the monomer (a2) during the polymerization. As a method for adding, it can be done collectively or dropped.

Examples of the polymerization initiator to be used in the suspension polymerization include, for example, azo initiators such as 2,2'-azobisisobutyronitrile and 2,2'-azobis-2,4-dimethylvaleronitrile; peroxide initiators such as benzoylperoxide, di-t-butylperoxide, t-hexyl peroxypivalate, t-hexyl peroxy isopropyl carbonate, t-butylperoxy-2-ethylhexanoate, and 1,1-di-t-butyl peroxy-2-methylcyclohexane. Among the radical polymerization initiators, benzoylperoxide, 2,2'-azobisisobutyronitrile, 2,2'-azobis-2,4-dimethylvaleronitrile, and t-hexyl peroxypivalate are preferable because of a good workability. The amount of these polymerization initiators used is preferably in the range of 0.001 to 3 pts·mass with respect to 100 pts·mass of the above monomer mixture.

Examples of the chain transfer agent to be used in the suspension polymerization include, for example, t-butylmercaptan, n-butylmercaptan, n-octylmercaptan, and n-dodecylmercaptan. The amount of these chain transfer agent used is preferably in the range of 0 to 3 pts·mass with respect to 100 pts·mass of the above monomer mixture.

Also, examples of the dispersing agent to be used in the suspension polymerization include, for example, polyvinyl alcohol, alkali metal salt which is a homopolymer or a copolymer of (meth)acrylilate, a copolymer of methyl methacrylate and sodium salt of methacrylate2-sulfoethyl, carboxyl cellulose, gelatin, starch, barium sulfate, calcium sulfate, calcium carbonate, magnesium carbonate, and calcium phosphate. The amount of these dispersing agents used is preferably in the range of 0.01 to 5 pts·mass with respect to 100 pts·mass of water. Also, where appropriate, dispersing assistance such as sodium chloride, potassium chloride, sodium sulfate, potassium sulfate and manganese sulfate can be combined together with these dispersing agents.

The water content used in the suspension polymerization is not particularly limited, however, a range of 100 to 1000 pts·mass with respect to 100 pts·mass of the monomer mixture is preferable, and a range of 150 to 400 pts·mass is more preferable. Also, the polymerization temperature of the suspension polymerization is not particularly limited, however, a range of 50 to 150° C. is preferable, and a range of 50 to 130° C. is more preferable.

To obtain the polymer (A), a UV absorber and a light stabilizer, an antioxidant, an antistatic agent, an antimicrobial agent, a flame retardant, an impact modifier, a light diffusing agent, a chain transfer agent, a filler or a reinforcing agent may be compounded.

Examples of the UV absorber and the light stabilizer include the following.

2-(2'-hydroxyphenyl)benzotriazoles which include, for example, 5' methyl-2-(2'-hydroxyphenyl)benzotriazole (made by Ciba JAPAN, TV-P), 2-hydroxy-benzophenones which include, for example, 4-hydroxy-2-hydroxy-benzophenone, steric hindered amine: which include, for example, bis(2,2,6,6-tetramethyl-4-piperidyl)sebacate (made by ADEKA CORPORATION, LS770), bis(1,2,2,6,6-pentamethyl-4-piperidyl) sebacate (made by Ciba JAPAN, TV-292), bis(1-octyloxy-2,2,6,6-pentamethyl-4-piperidyl) sebacate (made by Ciba JAPAN, TV-123), 2,4-bis[N-butyl-N-(1-cyclohexyloxy-2,2,6,6-tetramethylpiperidine-4-yl)amino]-6-(2-hydroxyethylamine)-1,3,5-triazine (made by Ciba JAPAN, TV-152), bis(1,2,2,6,6-pentamethylpiperidyl)-n-butyl-3,5-di-tertiary-butyl-4-hydroxybenzylmalonate, a condensation product of 1-hydroxyethyl-2,2,6,6-tetramethyl-4-hydroxypiperidine and succinic acid, a condensation product of N,N'-bis(2,2,6,6-tetramethyl-piperidyl)hexamethylene diamine and 4-t-octylamino-2,6-dichloro-s-triazine, tris(2,2, 6,6-tetramethyl-4-piperidyl)nitrilotriacetate, tetrakis(2,2,6, 6-tetramethyl-4-piperidyl)-1,2,3,4-butanetetracarboxylate, and 1,1'-(1,2-ethanediyl)-bis(3,3,5,5-tetramethylpiperazinone).

Hydroxyphenyl-s-triazines which include, for example, 2,6-bis(2,4-dimethylphenyl)-4-(2-hydroxy-4-octyloxyphenyl)-s-triazine.

In addition, 2-hydroxy-benzophenone derivatives, nickel compounds, and diamide oxalates.

Examples of the antioxidant include the following.

Alkylated monophenols: which include, for example, 2,6-di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, and 2,6-di-t-butyl-4-methoxymethylphenol.

Alkylated hydroquinones: which include, for example, 2,6-di-t-butyl-4-methoxyphenol, 2,5-di-t-butyl hydroquinone, 2,5-di-t-amyl hydroquinone, and 2,6-di-phenyl-4-octadecyloxyphenol.

In addition, hydroxylated dithiophenyl esters, alkylidene bisphenols, benzyl compounds, and acylaminophenols.

The amount of the additive compounded varies according to the use, but is generally 5% or less. If the amount of additive compounded is 3% or less, a decrease of a glass transition temperature of the obtained molding is small, and it is preferable from the viewpoint of heat resistance.

It is preferable that a number average molecular weight of the polymer (A) is 1000 to 1000000, and more preferable that the number average molecular weight is 2000 to 500000.

If the number average molecular weight of the polymer (A) is 1000 or more, volatilization of the polymer is suppressed.

The molding material (B) comprising the polymer (A) of the present invention will be described below.

<Molding Material (B)>

The molding material (B) of the present invention can use the polymer (A) as it is, or can comprise a material other than the polymer (A).

Examples of the material other than the polymer (A) include, for example: polyolefin which includes polyethylene and polypropylene; acrylic polymer which copolymerize poly(meth)acrylate such as polyethyl(meth)acrylete, polybutyl(meth)acrylete and other kinds of monomer; styrene polymer which copolymerize polystyrene and other kinds of monomer; organic polymer such as polyester or polyamide; organic low molecule such as boric acid ester or phosphoric acid ester; a glass in a fiber form, a small plate form or a granular form; metallic oxide such as aluminum hydroxide, aluminum oxide, titanium oxide, calcium hydroxide or boric acid; and inorganic compound such as hydroxide. Further, they include the UV absorber, the light stabilizer, the antioxidant, the antistatic agent, the antimicrobial agent, the flame retardant, the impact modifier, the light diffusing agent, the chain transfer agent, the filler or the reinforcing agent as stated in the above explanation regarding the polymer (A). These organic compounds and inorganic compounds may each be used alone, or mixture of a plurality of the compounds may be used.

Among these, the poly(meth)acrylester, the glass in the fiber form, the plate form or the granular form is preferable, and polymethacrylic acid methyl is further preferable because the obtained molding comes to have good appearance, transparency, and mechanical strength.

The content of the polymer (A) in the molding material (B) is preferably 50 wt % or more. This is because the obtained molding comes to have even better appearance, mechanical strength, and weather resistance.

The molding material (B) of the present invention comprises the polymer (A) which comprises 0.01 to 35 mol % of the monomer (a1). The content of the monomer (a1) in the molding material (B) is preferably 0.01 to 50 wt %, more preferably 0.1 to 30 wt %, and further preferably 0.1 to 20 wt %. If the content rate of the monomer (a1) in the molding material (B) is 0.01 wt % or more, there is a sufficient advantageous effect of weather resistance improvement. If it is 50 wt % or less, the obtained molding comes to have even better appearance and mechanical strength.

It is preferable that the molding material (B) of the present invention is molded at a temperature of 280° C. or lower. Note that, in the present invention, a highest treatment temperature in the molding process is called "molding temperature".

Although the molding temperature differs according to a fusion temperature of the molding material (B), it is preferably in a range of 200 to 260° C., and more preferably in a range of 200 to 240° C.

If the molding temperature is 280° C. or lower, group which is connected to nitroxide of the monomer (a1) is suppressed from being dissociated during the molding, and coloring of the obtained molding becomes difficult. Also, if the molding temperature is 200° C. or higher, the viscosity of the used molding material decreases adequately, and molding process becomes easy.

The molding material (B) can be molded to various molding by known methods such as an extrusion molding method, an injection molding method, and a compression molding method. Also, the molding material (B) can be made into a pellet form by extrusion molding, then the pellet can further be molded. Although the molding method is chosen by purpose, the extrusion molding method is preferable from the viewpoint of productivity. The molding material (B) of the present invention has excellent transparency. When a molding of a thickness of 2 mm is obtained by molding, a total light transmittance is preferably 85 to 100%, and more preferably 90 to 100%. A haze value is preferably 5% or less.

The molding of the present invention is useful as goods used outdoors such as a building material, because it has high weather resistance.

EXAMPLES

As follows, the present invention will be concretely explained by the examples, but the present invention is not limited to these examples.

Note that, "%" in the examples represents "mass %".

(1) Identification of the Monomer (a1)

For the confirmation of monomer (a1) structure, $^1$H-NMR JNM-EX270 (made by JEOL Ltd., (trade name)) was used.

The monomer (a1) was dissolved in deuterated chloroform, and the chemical compound was identified from the integral intensity of the peak and from the peak position. The measurement temperature is 25° C. and the number of scans is 16 times.

(2) Yellow Index Measurement

Transmission spectrum of the obtained molding was measured by a spectrophotometer MCPD-3000 (made by Otsuka electronics Co., Ltd.) and the yellow index was measured.

(3) Appearance (Coloring)

The obtained molding was observed with the naked eye and the existence of coloring was determined. If the yellow index was 10 or less, it was determined that there is no coloring.

(4) Total Light Transmittance and Haze Value

Total light transmittance and haze value was measured according to JIS-K7105, using a haze meter HM-65W made by Murakami Color Research Laboratory Co., Ltd.

Synthesis Example 1

Synthesis of Monomer (a1-1)

17.8 g (100 mmol) of 2,2,6,6-tetramethyl-4-hydroxypiperidine-N-oxide was dissolved in 100 ml of acetone, and 34 g (300 mmol) of 30% hydrogen peroxide aqueous solution was added slowly by taking 10 or more minutes. While cooling down to 5° C., 0.49 g (5.0 mol %) of copper chloride(I) was added, and the temperature of the reaction mixture was kept between 5° C. to 55° C. 15 minutes later, 0.5 g of 35% hydrochloric acid was added, and the reaction mixture was stirred at room temperature for 2 hours. After 2 hours, 50 ml of 4 mol/L sodium bisulfite aqueous solution and 100 ml of saturated potassium bicarbonate aqueous solution is added, and an extraction was carried out using 300 ml of ethyl acetate. The organic layer was concentrated by a rotary evaporator, and 1-methyloxy-2,2,6,6-tetramethyl-4-hydroxypiperidine was obtained.

The obtained 1-methyloxy-2,2,6,6-tetramethyl-4-hydroxypiperidine was dissolved in 50 ml of dichloromethane and 50 ml of triethylamine, and 10.4 g (100 mmol) of methacryloyl chloride was added slowly at 0° C. A reaction was carried out for 1 hour while gradually rising the temperature to room temperature. After 1 hour, the reaction mixture was concentrated by the rotary evaporator, 300 ml of water was added to the residue, and an extraction was carried out by 300 ml of ethyl acetate. The organic layer was concentrated by the rotary evaporator, and the residue was purified by a column chromatography (silica gel, hexane/ethyl acetate=10/1, volume ratio) to obtain 19.0 g of a colorless liquid (74.3% yield).

By a $^1$H-NMR measurement, it was confirmed that the product was the monomer (a1-1) shown in the following formula (2).

$^1$H-NMR (CDCl3): δ (ppm): 1.19 (s, 6H), 1.23 (s, 6H), 1.60 (m, 2H), 1.87 (m, 2H), 1.92 (s, 3H), 3.62 (s, 3H), 5.07 (m, 1H), 5.53 (s, 1H), 6.06 (s, 1H)

The structure of the monomer (a1-1) is shown in the following formula (2).

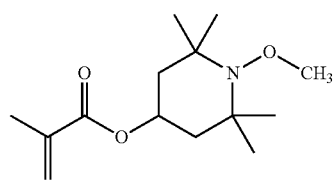

(2)

Synthesis Example 2

Synthesis of Monomer (a1-2)

8.6 g (50 mmol) of 2,2,6,6-tetramethyl-4-hydroxypiperidine-N-oxide was dissolved in 50 ml of methylethylketone, and 17 g (150 mmol) of 30% hydrogen peroxide aqueous solution was added slowly by taking 10 or more minutes. While cooling down to 5° C., 0.25 g (5.0 mol %) of copper chloride(I) was added, and the temperature of the reaction mixture was kept between 5° C. to 55° C. 15 minutes later, 0.2 g of 35% hydrochloric acid was added, and the reaction mixture was stirred at room temperature for 2 hours. After 2 hours, 25 ml of 4 mol/L sodium bisulfite aqueous solution and 50 ml of saturated potassium bicarbonate aqueous solution were added, and an extraction was carried out using 150 ml of ethyl acetate. The organic layer was concentrated by a rotary evaporator, and 1-ethyloxy-2,2,6,6-tetramethyl-4-hydroxypiperidine mixture was obtained. The obtained mixture contains 1-methyloxy-2,2,6,6-tetramethyl-4-hydroxypiperidine as an impure substance.

The obtained 1-ethyloxy-2,2,6,6-tetramethyl-4-hydroxypiperidine mixture was dissolved in 25 ml of dichloromethane and 25 ml of triethylamine, and 5.2 g (50 mmol) of methacryloyl chloride was added slowly at 0° C. A reaction was carried out for 1 hour while gradually rising the temperature to room temperature. After 1 hour, the reaction mixture was concentrated by the rotary evaporator, 150 ml of water was added to the residue, and an extraction was carried out by 150 ml of ethyl acetate. The organic layer was concentrated by the rotary evaporator, and the residue was purified by a column chromatography (silica gel, hexane/ethyl acetate=10/1, volume ratio) to obtain 8.0 g of a colorless liquid (59.4% yield).

By a $^1$H-NMR measurement, it was confirmed that the product was the monomer (a1-2) shown in the following formula (3).

$^1$H-NMR (CDCl3): δ (ppm): 1.11 (t, 3H), 1.20 (s, 12H), 1.59 (t, 2H), 1.87 (m, 2H), 1.92 (s, 3H), 3.78 (q, 2H), 5.07 (m, 1H), 5.53 (s, 1H), 6.06 (s, 1H)

The structure of the monomer (a1-2) is shown in the following formula (3).

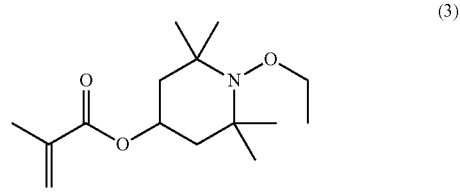 [SMILES: C=C(C)C(=O)OC1CC(C)(C)N(OCC)C(C)(C)C1]

(3)

Synthesis Example 3

Synthesis of Monomer (b1-1)

To a solution in which 30.3 g (300 mmol) of triethylamine and 34.4 g (200 mmol) of 4-hydroxy-2,2,6,6-tetramethylpiperidine-N-oxide(TEMPOL) are dissolved in 200 ml of tetrahydrofuran (THF), 25.5 g (250 mmol) of acetic anhydride was added at 0° C.

The temperature was raised to 25° C. to carry out a reaction for 12 hours, and it was then concentrated by a rotary evaporator. The residue was supplied to 1 liter of iced water, the precipitated orange solid was collected by filtration to obtain 33.8 g of 4-acetyloxy-2,2,6,6-tetramethylpiperidine-N-oxide.

21.4 g (100 mmol) of 4-acetyloxy-2,2,6,6-tetramethylpiperidine-N-oxide was dissolved in 200 ml of octane, 0.9 g (6 mmol) of molybdenum oxide (VI) was added, and it was heated to reflux for dehydration. With dehydration by azeotropy, 19.2 g (150 mmol) of 70% t-butyl hydroperoxide aqueous solution was dropped by taking 9 hours to carry out a reaction. After cooling to room temperature, 30 ml of saturated sodium bisulfite aqueous solution was added gradually to deactivate the unreacted peroxide. After a concentration of the organic layer by the rotary evaporator, the residue was dissolved in 100 ml of ethanol, 6.7 g (150 mmol) of potassium hydroxide was added to carry out a reaction at 25° C. for 2 hours.

The mixture was concentrated by the rotary evaporator, 200 ml of water was added to the residue, and an extraction was carried out using 200 ml in total of dichloromethane. After a concentration of the organic layer by the rotary evaporator, it was dissolved in 20 ml of dichloromethane and 10 ml of triethylamine, and 10.5 g (100 mmol) of methacryloyl chloride was added at 0° C. to carry out a reaction for 1 hour. The mixture was concentrated by the rotary evaporator, 200 ml of water was added to the residue, and an extraction was carried out using 200 ml in total of ethyl acetate. The organic layer was concentrated by the rotary evaporator and the residue was purified by a column chromatography (silica gel, hexane/ethyl acetate=20/1, volume ratio) to obtain 26.3 g of a colorless liquid (74.4% yield).

By a $^1$H-NMR measurement, it was confirmed that the product was the monomer (b1-1) shown in the following formula (4).

$^1$H-NMR (CDCl3): δ (ppm): 0.89 (m, 6H), 1.17 (m, 10H), 1.18 (s, 6H), 1.21 (s, 6H), 1.61 (m, 2H), 1.85 (m, 2H), 1.92 (s, 3H), 3.60-3.93 (m, 1H), 5.07 (m, 1H), 5.53 (s, 1H), 6.03 (s, 1H)

The structure of the monomer (b1-1) is shown in the following formula (4).

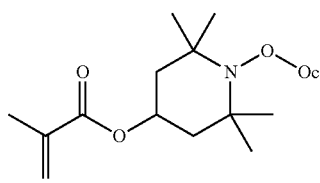

(4)

(In the formula, Oc is a structure represented by the following formulas (5) to (7). Hereinafter, the following formulas (5) to (7) are represented by "Oc".)

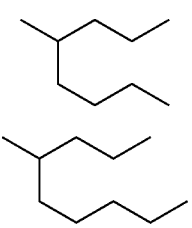

(5)

(6)

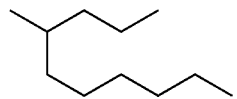

(7)

Synthesis Example 4

Polymer (1)

2.90 mol (290 g) of methyl methacrylate (MMA), 90 mmol (7.7 g) of methyl acrylate, 0.88 g of octylmercaptan, 0.66 g of AIBN, 10 mmol (2.6 g) of the monomer (a1-1), 600 g of water, 4.0 g of sodium sulfate, and 4.4 g of dispersing agent were supplied to a separable flask with a mixer, and were degassed by nitrogen bubbling for 30 minutes. After 30 minutes, the temperature was raised to 70° C. while stirring, and was kept for 3 hours. After confirming the exothermic peak, the temperature is raised to 90° C. and was kept for 30 minutes. After, it was cooled to room temperature and the polymer was taken out and washed with water, to obtain the polymer (1) in a granular form.

Synthesis Example 5 to 7

Polymers (2) to (4)

Polymers (2) to (4) were obtained by the similar process as in the Synthesis Example 4, except that the amount of the monomer (a1-1) was the amount shown in Table 1 as "amount of HALS". Note that in Table 1, the amount of HALS is represented by the content rate (mol % and wt %) of the HALS within all the monomers which was used to obtain the molding material (B).

Synthesis Example 8

Polymer (5)

Polymer (5) was obtained by the similar process as in the Synthesis Example 4, except that the monomer (a1-2) was used instead of the monomer (a1-1), and the amount shown in Table 1 as "amount of HALS" was added.

Synthesis Example 9

Polymer (6)

Polymer (6) was obtained by the similar process as in the Synthesis Example 4, except that the monomer (a1-1) was not used.

Synthesis Example 10

Polymer (7)

Polymer (7) was obtained by the similar process as in the Synthesis Example 4, except that the monomer (TV123) was used instead of the monomer (a1-1), and the amount shown in Table 1 as "amount of HALS" was added.

Synthesis Example 11

Polymer (8)

Polymer (8) was obtained by the similar process as in the Synthesis Example 4, except that the monomer (b1-1) was used instead of the monomer (a1-1), and the amount shown in Table 1 as "amount of HALS" was added.

Examples 1 to 16

The polymer or its mixture obtained by the Synthesis Examples was used as shown in Table 1, supplied to a compact injection molding machine CS-183-MMX (made by Custom Scientific Instruments Inc.), and held for 3 minutes at a predetermined cylinder temperature (shown in Table 2). After, using a mold of 10 mm×20 mm×2 mm, the molding (1) to (16) were formed by injection molding at a mold temperature of 60° C.

The yellow index, appearance and the used polymer of the produced molding are shown in Table 2.

Comparative Examples 1 to 3

Molding (17) to (19) were obtained in the similar manner as in the Example (1), except that polymer used was changed as shown in Table 2. The yellow index, appearance and the used polymer of the produced molding are shown in Table 2.

[Table 1]

TABLE 1

|  | Polymer | HALS | HALS content (mol %) | HALS content (wt %) |
| --- | --- | --- | --- | --- |
| Synthesis Example 4 | 1 | a 1- 1 | 0.3 | 0.76 |
| Synthesis Example 5 | 2 | a 1- 1 | 1 | 2.52 |
| Synthesis Example 6 | 3 | a 1- 1 | 3 | 7.34 |
| Synthesis Example 7 | 4 | a 1- 1 | 10 | 22.16 |
| Synthesis Example 8 | 5 | a 1- 2 | 1 | 2.66 |
| Synthesis Example 9 | 6 | — | — | — |
| Synthesis Example 10 | 7 | TV123 | 0.5 * | 3.60 |
| Synthesis Example 11 | 8 | b 1- 1 | 1 | 3.46 |

The abbreviations in the Table:
TV-123:
bis(1-octyloxy-2,2,6,6-pentamethyl-4-piperidyl)sebacate (made by Ciba JAPAN, TV-123)
*Since TV-123 have two HALS sites in the molecule, the mol number of the HALS site comes to be twice the added mol number. The structure of TV 123 is shown in formula (8).

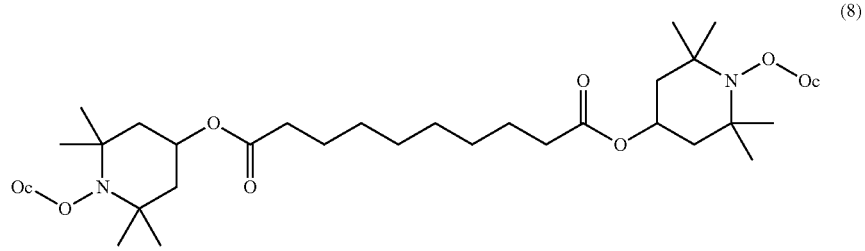

(8)

TABLE 2

|  | Polymer | Cylinder Temperature (° C.) | Heating Time (min) | Yellow Degree | Apperance (Coloring) | Molding | Total Light Transmittance (%) | Haze (%) |
| --- | --- | --- | --- | --- | --- | --- | --- | --- |
| Embodiment 1 | 1 | 260 | 3 | 1.6 | Absent | 1 | 91.6 | 0.98 |
| Embodiment 2 | 2 | 260 | 3 | 2.6 | Absent | 2 | 91.1 | 1.20 |
| Embodiment 3 | 3 | 260 | 3 | 2.9 | Absent | 3 | 90.9 | 1.68 |
| Embodiment 4 | 4 | 260 | 3 | 5.8 | Absent | 4 | 90.2 | 1.89 |
| Embodiment 5 | 3 + 6** | 260 | 3 | 1.2 | Absent | 5 | 92.1 | 1.01 |
| Embodiment 6 | 4 + 6** | 260 | 3 | 2.2 | Absent | 6 | 91.1 | 1.80 |
| Embodiment 7 | 5 | 260 | 3 | 8.8 | Absent | 7 | 90.1 | 1.92 |
| Embodiment 8 | 2 | 220 | 3 | 0.6 | Absent | 8 | 92.0 | 1.89 |
| Embodiment 9 | 2 | 240 | 3 | 1.1 | Absent | 9 | 91.9 | 2.08 |
| Embodiment 10 | 2 | 280 | 3 | 5.0 | Absent | 10 | 90.1 | 2.01 |
| Embodiment 11 | 2 | 220 | 10 | 1.2 | Absent | 11 | 92.1 | 1.76 |
| Embodiment 12 | 2 | 240 | 10 | 2.6 | Absent | 12 | 92.1 | 1.67 |
| Embodiment 13 | 5 | 220 | 3 | 1.0 | Absent | 13 | 91.1 | 1.80 |
| Embodiment 14 | 5 | 240 | 3 | 1.8 | Absent | 14 | 92.0 | 1.89 |
| Embodiment 15 | 5 | 280 | 3 | 9.3 | Absent | 15 | 90.5 | 4.65 |
| Embodiment 16 | 5 | 220 | 10 | 7.8 | Absent | 16 | 88.4 | 3.98 |
| Comparative Example 1 | 7 | 260 | 3 | 20.0 | Present | 17 | 88.2 | 2.15 |
| Comparative Example 2 | 8 | 260 | 3 | 23.5 | Present | 18 | 88.0 | 11.24 |
| Comparative Example 3 | 8 | 260 | 10 | 87.1 | Present | 19 | 62.3 | 29.63 |

**With respect to 1 pts. mass of polymer 3 or 4, by adding 9 pts. mass of polymer 6 which does not comprise HALS, it is diluted so that the HALS content of the polymer 3 or 4 with the 9 pts. mass of polymer 6 added becomes one-tenth of the polymer 3 or 4, respectively.

As is clear from Table 2, the molding 1 to 16 using the molding material of the present invention had yellow degree of 10 or less, and had good appearance.

The molding (17) to (19) that use the molding material comprising the monomer (b1-1) and TV123 that are of a different construction from the monomer (a1) of the present invention had high yellow degree, and had bad appearance (Comparative Examples 1 to 3).

The molding using the molding material of the present invention comprises NOR-HALS and has good weather resistance.

INDUSTRIAL APPLICABILITY

With the molding material of the present invention, the molding comprising NOR-HALS with suppressed coloring due to degradation of the NOR-HALS can be produced. The molding produced by the present invention has good weather resistance and is useful as goods used outdoors such as a building material, because it comprises the NOR-HALS.

The invention claimed is:

1. A molding material, consisting essentially of
   a polymer (A) obtained by polymerizing 0.01 to 35 mol % of monomer (a1) of formula (1) and 65 to 99.99 mol % of monomer (a2) whose main component is methyl methacrylate, and
   optionally one or more of materials other than the polymer (A) selected from the group consisting of an organic polymer of polyolefins; an acrylic polymer; a styrene polymer: a polyester; a polyimide; a boric acid ester; a phosphoric acid ester; glass in a fiber, small plate, or granular form; a metallic oxide; a UV absorber; a light stabilizer, an antioxidant; an antistatic agent; an antimicrobial agent; a flame retardant; an impact modifier a light diffusing agent; a chain transfer agent; a filler; and a reinforcing agent,

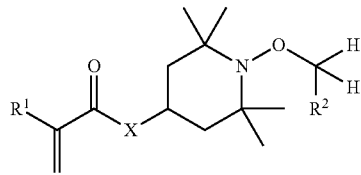

(1)

wherein

R$^1$ is a hydrogen atom or a methyl group,

X is an oxygen atom or an imino group, and

R$^2$ is a hydrogen atom, a linear or a branched alkyl group with a carbon number of 1 to 8, an alicyclic hydrocarbon group with a carbon number of 6 to 8 which optionally comprises a substituent, or an aryl group which optionally comprises a substituent;

wherein a content of a component derived from the monomer (a1) in 100 wt % of the molding material is from 0.01 to 50 wt %; and wherein in the case a molding having a thickness of 2 mm is obtained by molding the molding material, a total light transmittance is from 85 to 100% and a haze value is 5% or less.

2. The molding material according to claim 1, wherein a content of the polymer is 50 wt % or more.

3. A method of molding the molding material according to claim 1, the method comprising
   molding the molding material at a temperature of 280° C. or lower.

4. A molding, obtained by the method according to claim 3.

5. The molding according to claim 4, wherein a total light transmittance of the molding at a thickness of 2 mm is from 85 to 100% and a haze value of the molding at a thickness of 2 mm is 5% or lower.

6. The molding material according to claim 1, wherein the molding material is obtained by a process comprising:
   supplying the polymer to an injection molding machine;
   fusing and holding for three minutes; and then
   injection molding with a mold having a dimension of 10 mm×20 mm×2 mm at a mold temperature of 60° C., to obtain a molding having a yellow index of 10 or less.

7. The molding according to claim 5, wherein a yellow index of the molding is ten or less.

* * * * *